United States Patent [19]

Langhorst

[11] Patent Number: 5,654,620

[45] Date of Patent: Aug. 5, 1997

[54] SENSORLESS SPEED DETECTION CIRCUIT AND METHOD FOR INDUCTION MOTORS

[75] Inventor: Phillip G. Langhorst, Crestwood, Mo.

[73] Assignee: MagneTek, Inc., Nashville, Tenn.

[21] Appl. No.: 401,450

[22] Filed: Mar. 9, 1995

[51] Int. Cl.[6] ............................................. H02P 7/00
[52] U.S. Cl. ........................... 318/716; 318/254; 324/177
[58] Field of Search ............................... 318/254, 439,
318/138, 798–815; 73/451, 505, 507, 517 R,
517 A, 519, 862.193, 862.473; 324/166,
167, 168, 177

[56] References Cited

U.S. PATENT DOCUMENTS

| | | | |
|---|---|---|---|
| 4,292,573 | 9/1981 | Ebert et al. | 318/138 |
| 4,689,542 | 8/1987 | Ibori et al. | 318/806 X |
| 4,839,589 | 6/1989 | Heinle | 318/801 X |
| 5,247,235 | 9/1993 | Tu et al. | 318/138 X |
| 5,264,772 | 11/1993 | Bahn | 318/254 X |

*Primary Examiner*—Jonathan Wysocki
*Attorney, Agent, or Firm*—Waddey & Patterson; Mark J. Patterson

[57] ABSTRACT

The present invention provides a sensorless circuit for detecting rotational speed of a rotor in an induction motor. The circuit includes a switch between the AC source driving the motor and a motor phase winding. When the switch is closed, there is developed across the phase winding a voltage waveform from the AC source. When the switch is subsequently opened, there is developed across the winding a residual voltage waveform induced by the rotor. The speed of the motor is determined by measuring a time interval between selected points on the voltage waveform.

18 Claims, 5 Drawing Sheets

5,654,620

SENSORLESS SPEED DETECTION CIRCUIT AND METHOD FOR INDUCTION MOTORS

BACKGROUND OF THE INVENTION

1. Technical Field

The present invention relates generally to speed detectors for electromechanical devices, and in particular to circuits and methods for detecting the rotational speed of induction motors.

2. Background Art

Typical prior-art arrangements for detecting the rotational speed of a motor call for a stator-mounted sensor, which can be either optical or magnetic, and a corresponding wheel mounted to the rotor shaft.

SUMMARY OF THE INVENTION

A preferred embodiment of the present invention provides a sensorless circuit for detecting rotational speed of a rotor in an induction motor. The circuit includes a switch between the AC source driving the motor and a motor phase winding. When the switch is closed, there is developed across the phase wining a voltage waveform from the AC source. When the switch is subsequently opened, there is developed across the winding a residual voltage waveform induced by the rotor. The speed of the motor is determined by measuring a time interval between selected points on the voltage waveform.

The present invention is particularly advantageous, because the circuitry is inexpensive to add to existing system controllers, such as blower controls, ignition controls, and valve controls. It can be applied to various motor designs, including shaded-pole, PSC, split-phase, and three-phase motors.

DESCRIPTION OF SPECIFIC EMBODIMENTS

Figure 1:
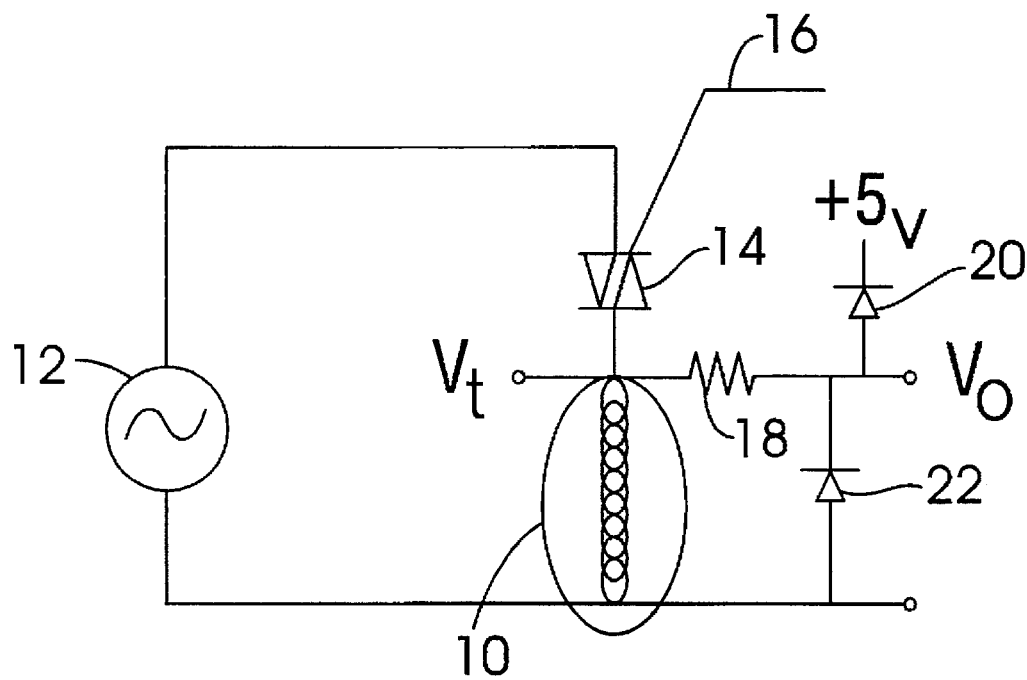
FIG. 1 shows a circuit diagram of a preferred embodiment of a sensorless speed detection circuit according to the present invention.

A preferred embodiment of a speed detection circuit according to the present invention is shown in FIG. 1. The circuit is used to detect the rotational speed of a motor 10 with an induced rotor field. The motor 10 is driven by an alternating current source 12, which in the present preferred embodiment is an AC mains supply. The motor 10 is selectably connected to and disconnected from the AC supply 12 by means of a switch 14, which in the present embodiment is a triac. The triac is controlled by a voltage applied at gate terminal 16. As is apparent from FIG. 1, so long as switch 14 is conducting, voltage $v_t$ across the motor 10 will be equal to the mains voltage.

Figure 2:
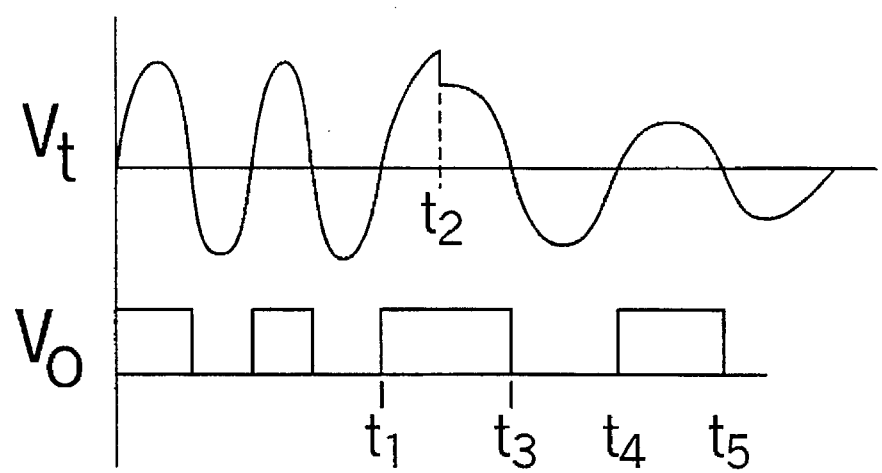
FIG. 2 shows a graph of the voltages at terminals $v_t$ and $v_o$ in FIG. 1, mapped against time.

For reasons set forth below, in the FIG. 1 embodiment of the present invention, it is desirable to extract only the frequency component of the terminal voltage $v_t$. This is accomplished through the use of an amplitude rejection circuit, comprising resistor 18, diodes 20 and 22, and a +5 V DC supply. The amplitude rejection circuit clamps the terminal voltage to 5 volts, creating a square-wave output $v_o$. FIG. 2 shows a graph of voltages $v_t$ and $v_o$ mapped against time. As shown in FIG. 2, the edges of square wave $v_o$ correspond to the zero-crossing points of voltage $v_t$.

Operation of the speed detection circuit is initiated at time $t_1$ by de-energizing gate terminal 16, causing switch 14 to open, thereby disconnecting motor 10 from AC source 12. Because switch 14 is a triac in the present embodiment, it will continue to conduct so long as current flows through it, i.e., until time $t_2$ in FIG. 2. Thus, between time $t_1$ and $t_2$, the voltage across the motor phase will continue to be equal to the mains voltage. When current flow reaches zero at time $t_2$, triac 16 will cease to conduct, and the voltage across the motor phase will drop to the residual emf generated by the remaining rotor magnetic field.

The amplitude of the residual emf is a function of both the strength of the field remaining and the rotor speed. However, the frequency of the residual emf depends only upon the rotor speed. Thus, in the present embodiment, the rotor speed of motor 10 is determined by measuring the time between selected edges of square wave $v_o$.

The obvious choice of when to time the edges of square wave $v_o$ is well after the current has ceased to flow. However, it has been found through experimentation that the emf is weak at low speeds, being as low as 3 V by the third half-cycle, turning the square wave sinusoidal and making reliable speed information hard to extract. Waiting for the motor emf to cross zero twice means that the motor must be off for a number of cycles, which may cause undesirable effects, such as current/torque pulses, or slowing of the motor. It would be possible to time after current zero by simply waiting one-half line cycle. The current would be zero then. However, waiting for the current to be zero will involve extra cost if it must be sensed.

Figure 3:
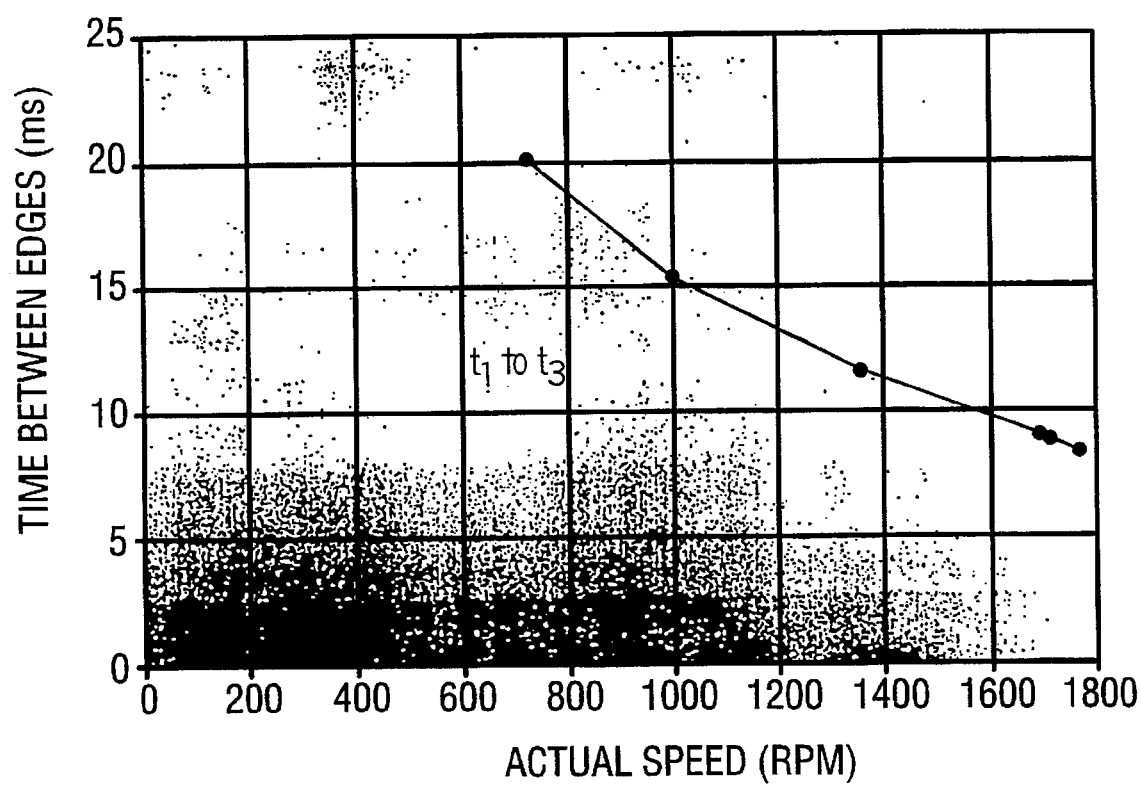
FIG. 3 shows a graph of the relationship between time interval $t_3-t_1$ in FIG. 2 and motor rotational speed.

The present preferred embodiment is timed from $t_1$ to $t_3$, even though during the time interval between $t_1$ and $t_2$, the mains current has not yet ceased to flow. However, timing from $t_1$ to $t_3$ minimizes the time that the motor is off and also maximizes the signal strength. Through experimentation, it has been found that there is good correlation of this timing to speed, down to 40 percent of synchronous speed, as shown in FIG. 3, which is a chart mapping the time between edges in microseconds and the actual motor speed in RPMs.

The time from $t_1$ through $t_3$ includes the time from mains zero cross to current zero ($t_1$ to $t_2$), which is a function of the motor's power factor. This may cause variability from motor to motor and across the range of input voltage. However, experimentation has shown that there is not much change in the total time $t_1$ to $t_3$ due to line voltage in shaded-pole motors.

In some applications, such as burner combustion air flow regulation, a calibration by the installer will eliminate unit-to-unit variations, as well as the need to know the actual RPM speed of the motor. The installer would adjust the controller to increase $t_1-t_3$. The controller would have to slow the motor to do this, but when $t_1-t_3$ equals the set point, it would hold that condition, thereby holding the speed.

It would also be within the spirit of the invention to construct a hybrid system, in which different time intervals are measured depending upon the rotor speed. At higher rotor speeds, such a system measures intervals after current zero at time $t_2$. At lower rotor speeds, the system drops to measuring $t_1$–$t_3$, when signals beyond $t_3$ are weak. Alternatively, a low-cost system can time from $t_1$ to $t_4$, since $v_o$ at both times are rising edges; many microcontrollers have built-in rising-edge interruption.

Figure 4:
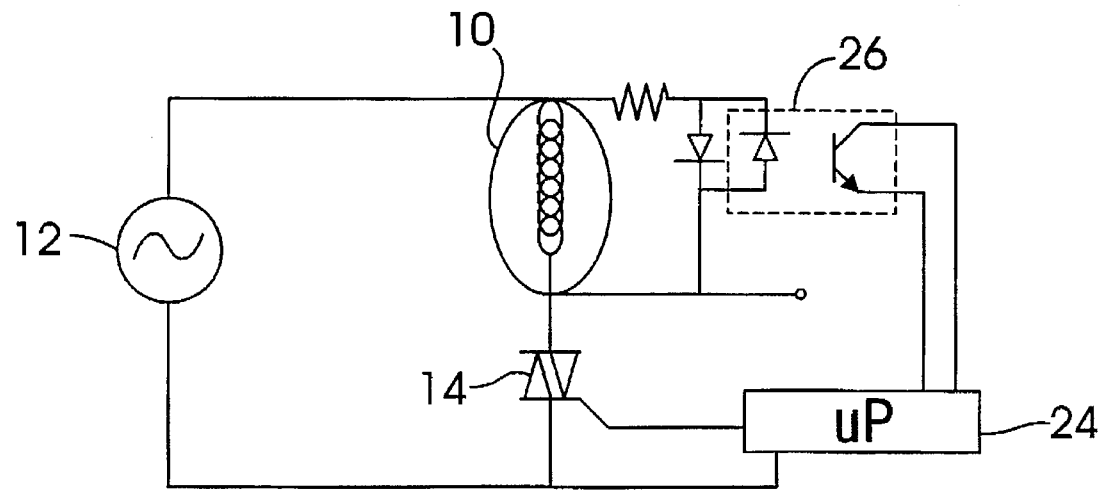
FIG. 4 shows an alternative preferred embodiment of a sensorless speed detection circuit according to the present invention employing a photocoupling arrangement.

In a preferred embodiment of the present invention, shown in FIG. 4, a microprocessor 24 provides the functions of timer, switch duty control and feedback. It will be seen that, using feedback, the present invention can be used to hold the motor speed at a desired level by changing the on-off duty cycle of the switch. In the FIG. 4 embodiment, the amplitude rejection function is external to the microprocessor, being provided by an opto-coupler 26. This allows switch 14 to be in common with the controller, which is advantageous in many motor systems.

Figure 5:
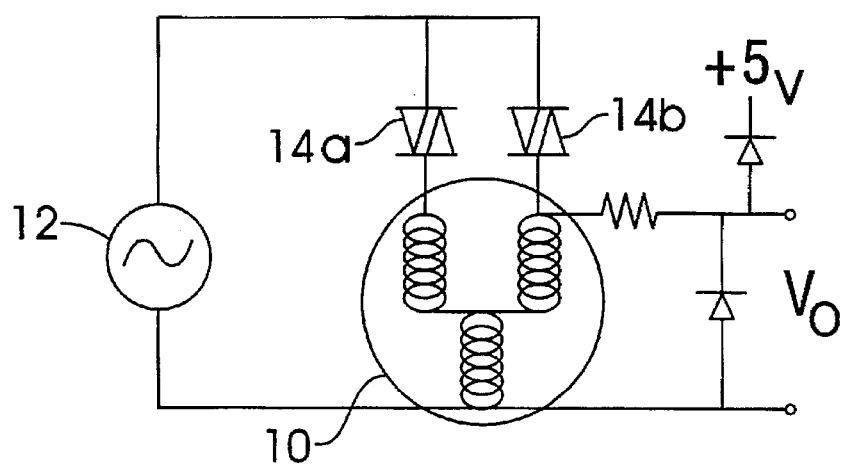
FIG. 5 shows an alternative preferred embodiment of the present invention adapted for use in a three-phase motor.

As shown in FIG. 5, the present invention can also be practiced in three-phase and PSC motors. The sensing circuit for the three-phase motor would be the same. However, two switches 14a, 14b are needed to disconnect the motor from the mains supply. PSC motors present more of a problem due to the energy stored in the capacitor. This energy may corrupt the timing if the control circuitry does not wait until this energy is dissipated.

It will be appreciated that the present invention has more general application. For example, the invention could be used to measure the motor speed for display, or as an input to another type of speed control. Also, conversion to actual speed is not necessary. In many application, the invention will be used to measure time between zero crossings, and that will be the quantity to be controlled, without ever making the conversion to actual RPM or frequency.

Figure 6:
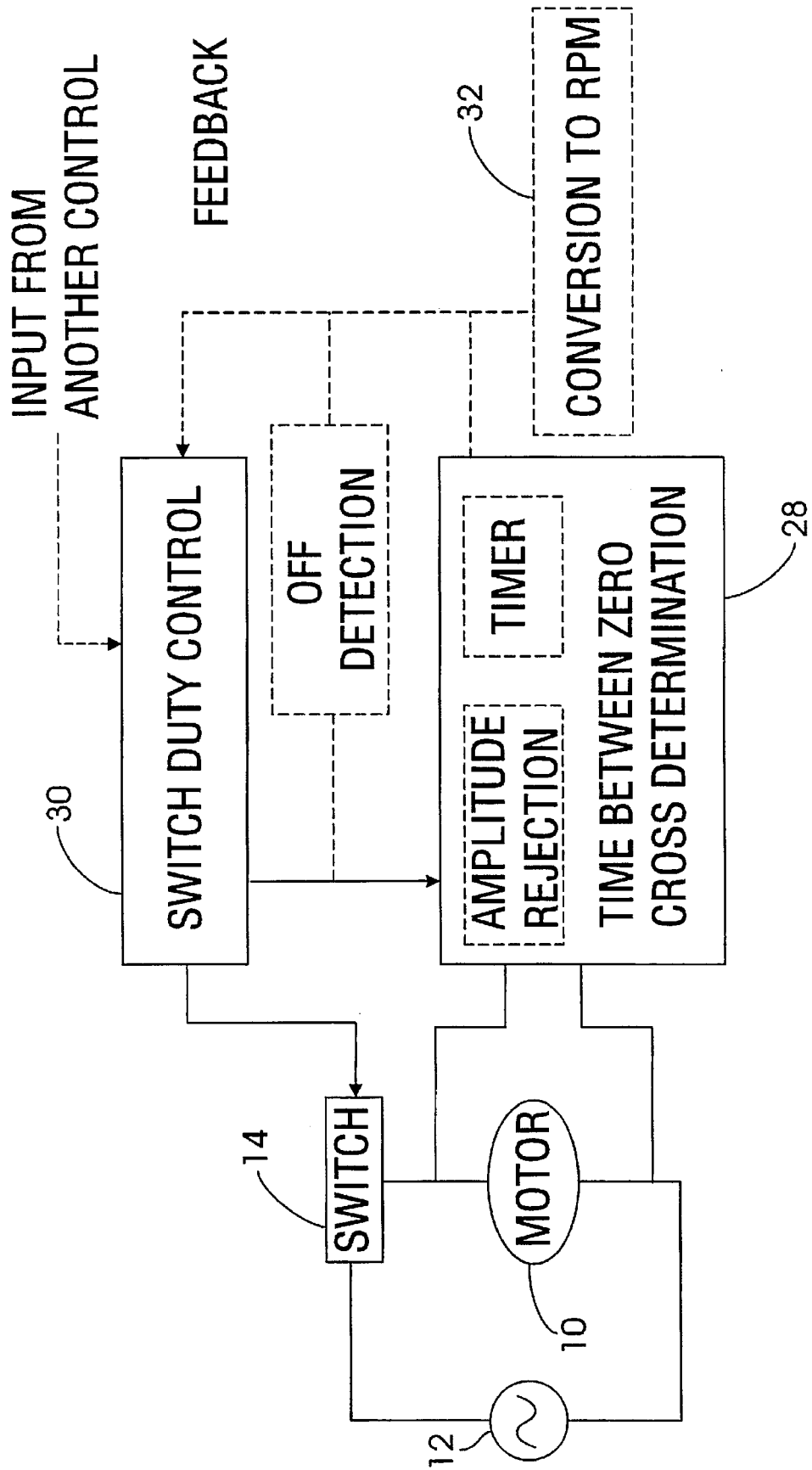
FIG. 6 shows a block diagram of alternative configurations of a sensorless speed detection circuit according to the present invention.

FIG. 6 shows a block diagram of a speed detection circuit according to the present invention, with various optional features shown in broken lines. The minimum requirements to practice the present invention are:

(1) a motor 10 having an induced rotor field;

(2) a switch capable of causing the current in at least one motor phase to stop (acceptable switches include triacs, relays, SCRs, contactors, or transistors);

(3) zero-cross detection means 28, capable of detecting the zero-crossing points of the voltage across one phase of motor 10, and measuring the time between the detected zero-crossing points;

(4) switch control means 30 for controlling switch 14, turning it off at regular intervals, or when instructed by another control, and capable of sending a signal to the timer indicating a "switch is off" condition.

Figure 7A:
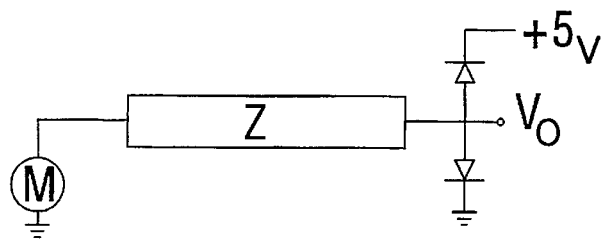
FIGS. 7A–E show alternative embodiments of amplitude rejection circuitry that can be used in the present invention.
Figure 7B:
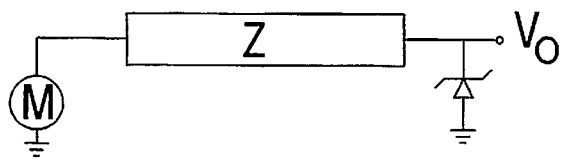
Figure 7C:
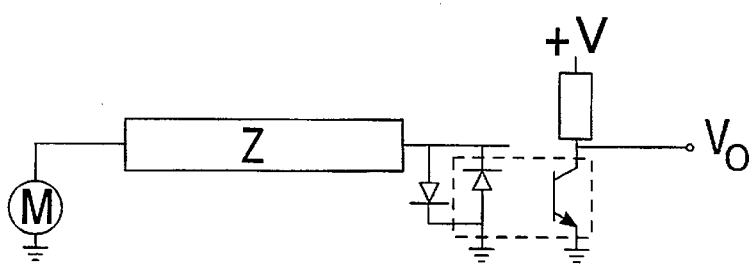
Figure 7D:
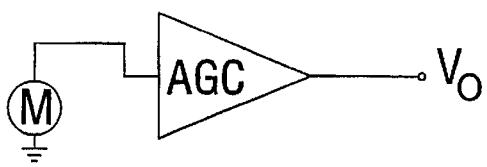
Figure 7E:
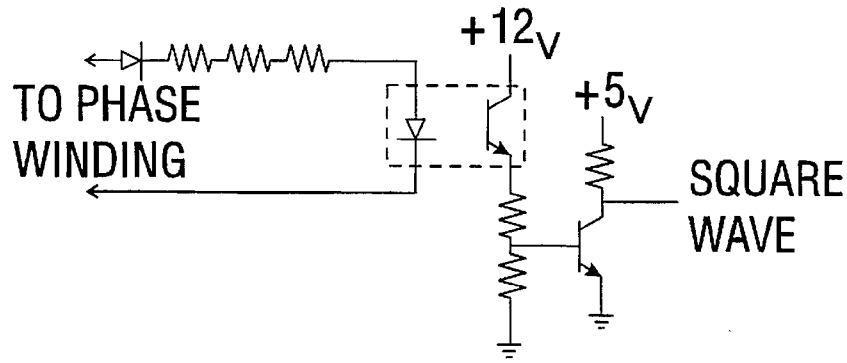

The zero-cross detection function can be accomplished directly by digitizing the motor emf and timing zero-to-zero with a microprocessor. The simplest approach to digitizing the motor emf is to reject the emf's amplitude, using any of a number of different circuits, including those shown in FIG. 7A–D. FIG. 7A shows a series impedance Z, which can be an inductor, resistor, or capacitor, connecting motor M to a diode network, such as that shown in FIG. 1. FIG. 7B shows a series impedance into a Zener diode. FIG. 7C shows a series impedance into an opto-diode, with a signal being generated on a receiver phototransistor; this arrangement is used in the FIG. 4 embodiment. FIG. 7D shows a variable gain amplifier. A preferred embodiment of a more complex amplitude rejection circuit is shown in FIG. 7E.

The output of the amplitude rejection means is a square wave, and a timer measures the time between the various edges. The timer function could be implemented in any of a number of ways known in the art, including by a microprocessor via software, via edge-triggered interrupts, or via an on-chip timer; an edge-triggered flip-flop gating digital counter; or by an analog phase locked loop.

The switch control means 30 is necessary to gate the timer so it only times pulses when the motor is off. The control means can be implemented by: a microprocessor, a 555 timer, an analog oscillator, digital flip-flops with delay elements; or digital gates (AND, OR, etc.), with delay elements.

Other alternative embodiments would also fall within the scope of the present invention. One alternative would be to NOT gate the timer, let it measure all edges, and gate the circuit that receives the time information so it would only record or display during "off" time. A second alternative would be to eliminate the switch control means 30 and replace it with a circuit capable of determining that the switch is off. This option may be preferred incases where the switch is remote, or is being controlled by an inaccessible system. A comparator, for example, could be used. A third possibility would be a detector at the output of the timer that could discriminate the line-frequency time. The line-frequency time is normally very exact; the system could provide a signal output when this time departs significantly from the expected value, since this would mean that the line must be disconnected.

The optional conversion to RPM 32 would best be accomplished by a microprocessor running the time information through a look-up table to account for the nonlinearities to arrive at RPM. The function could also be implemented by a ROM or an analog circuit capable of the 1/X function.

While the foregoing description includes detail which will enable those skilled in the art to practice the invention, it should be recognized that the description is illustrative in nature and that many modifications and variations will be apparent to those skilled in the art having the benefit of these teachings. It is accordingly intended that the invention herein be defined solely by the claims appended hereto and that the claims be interpreted as broadly as permitted in light of the prior art.

What is claimed:

1. A circuit for detecting rotational speed of a rotor in an induction motor, the motor including a phase winding connected to an AC power supply, the circuit comprising:

switching means for selectably opening and closing the connection of the winding to the AC power supply, such that when the connection is closed, there is developed across the winding a periodic voltage waveform from the AC power supply, and such that when the connection is subsequently opened, there is developed across the winding a residual periodic voltage waveform induced by the rotor.

amplitude rejection circuit means for extracting the frequency component of the periodic voltage waveform, creating a square wave with edges corresponding to the zero-crossing points of the periodic voltage waveform;

controller means for controlling the duty cycle of the switching means and for measuring the time interval between selected edges of the square wave.

2. A circuit according to claim 1, wherein the amplitude rejection means comprises a series impedance into a diode network.

3. A circuit according to claim 1, wherein the amplitude rejection means comprises a series impedance into a Zener diode.

4. A circuit according to claim 1, wherein the amplitude rejection means comprises a series impedance into an opto-diode, with a signal being generated on a receiver phototransistor.

5. A circuit according to claim 1, wherein the amplitude rejection means comprises a variable gain amplifier.

6. A circuit according to claim 1, wherein the controller means includes:

means for causing the switching means to open the connection between the winding and the AC power supply at a first selected edge of the square wave and means for measuring the time interval between the first selected edge and a subsequent edge of the square wave.

7. A circuit according to claim 6, wherein the controller means includes means for measuring the time interval between the first selected edge of the square wave and the next successive edge of the square wave.

8. A circuit according to claim 6, wherein the controller means includes means for measuring the time interval between the first selected edge of the square wave and the next successive edge of like polarity.

9. A circuit according to claim 1, further including:

means for detecting a zero-current condition through the phase winding; and wherein the controller means includes means for causing the switching means to open the connection between the AC source and the winding at a first selected edge of the square wave, the timing means measuring the time interval between selected edges of the square wave subsequent to the detection of a zero-current condition.

10. A circuit according to claim 9, wherein the controller means further includes:

means for measuring a time interval between the first selected edge of the square wave and a subsequent edge; and mode selection means for selecting between a lower-speed mode in which a time interval is measured between the first selected edge of the square wave and a subsequent edge, and a higher-speed mode in which a time interval is measured between selected edges of the square wave subsequent to the detection of a zero-current condition.

11. A circuit according to claim 1, wherein the controller means further includes:

conversion means for converting the measured time interval between selected points on the periodic voltage waveform into a signal proportional to revolutions per minute.

12. An improved motor of the type including a rotor driven by an AC power supply connected to a phase winding, the improvement comprising:

switching means for opening and closing the connection of the winding to the AC power supply, such that when the connection is closed, there is developed across the winding a periodic voltage waveform induced by the AC source, and such that when the connection is subsequently opened, there is developed across the winding a residual periodic voltage waveform induced by the rotor;

amplitude rejection circuit means for extracting the frequency component of the periodic voltage waveform, creating a square wave with edges corresponding to the zero-crossing points of the periodic voltage waveform;

controller means for controlling the duty cycle of the switching means and for measuring the time interval between selected edges of the square wave.

13. A circuit according to claim 1 further including feedback means for holding the motor speed at a desired level.

14. A method for detecting rotational speed of a rotor in an induction motor, the motor including a phase winding connected to an AC power supply, the method comprising:

providing switching means for opening and closing the connection of the winding to the AC power supply, such that when the connection is closed, there is developed across the winding a periodic voltage waveform from the AC power supply, and such that when the connection is subsequently opened, there is developed across the winding a residual periodic voltage waveform induced by the rotor;

extracting the frequency component of the periodic voltage waveform, thereby creating a square wave with edges corresponding to the zero-crossing points of the periodic voltage waveform;

controlling the duty cycle of the switching means and measuring the time interval between selected edges of the square wave.

15. A method according to claim 14, wherein the step of controlling the duty cycle of the switching means and measuring the time interval between selected edges of the square wave includes:

causing the switching means to open the connection between the winding and the AC power supply at a first selected edge of the square wave; and measuring the time interval between the first selected edge and a subsequent edge of the square wave.

16. A method according to claim 14, wherein the step of controlling the duty cycle of the switching means and measuring the time interval between selected edges of the square wave includes:

detecting a zero-current condition through the phase winding;

causing the switching means to open the connection between the AC source and the winding at a first selected edge of the square wave;

measuring the time interval between selected edges of the square wave subsequent to the detection of a zero-current condition.

17. A method according to claim 16, wherein the step of controlling the duty cycle of the switching means and measuring the time interval between selected edges of the square wave further includes:

measuring a time interval between the first selected edge of the square wave and a subsequent edge; and selecting between a lower-speed mode in which a time interval is measured between the first selected edge of the square wave and a subsequent edge, and a higher-speed mode in which a time interval is measured between selected edges of the square wave subsequent to the detection of a zero-current condition.

18. A method according to claim 14, wherein the step of controlling the duty cycle of the switching means and measuring the time interval between selected edges of the square wave further includes:

providing including feedback means for holding the motor speed at a desired level.

* * * * *